United States Patent
Sawada et al.

(10) Patent No.: US 11,316,710 B2
(45) Date of Patent: Apr. 26, 2022

(54) CONTROL SYSTEM AND CONTROL METHOD

(71) Applicant: OMRON Corporation, Kyoto (JP)

(72) Inventors: Shigenori Sawada, Takatsuki (JP); Akihiro Tamura, Moriyama (JP); Yuji Ikeo, Kusatsu (JP)

(73) Assignee: OMRON Corporation, Kyoto (JP)

( * ) Notice: Subject to any disclaimer, the term of this patent is extended or adjusted under 35 U.S.C. 154(b) by 22 days.

(21) Appl. No.: 16/981,290

(22) PCT Filed: Mar. 20, 2019

(86) PCT No.: PCT/JP2019/011873
§ 371 (c)(1),
(2) Date: Sep. 16, 2020

(87) PCT Pub. No.: WO2019/193980
PCT Pub. Date: Oct. 10, 2019

(65) Prior Publication Data
US 2021/0044449 A1 Feb. 11, 2021

(30) Foreign Application Priority Data

Apr. 3, 2018 (JP) .............................. JP2018-071312

(51) Int. Cl.
*G06F 15/16* (2006.01)
*H04L 12/40* (2006.01)
(Continued)

(52) U.S. Cl.
CPC ...... *H04L 12/40019* (2013.01); *G05B 19/042* (2013.01); *H04L 12/40013* (2013.01); *H04L 67/06* (2013.01); *H04L 67/1097* (2013.01)

(58) Field of Classification Search
CPC ......... H04L 12/40019; H04L 12/40013; H04L 67/06; H04L 67/1097; G05B 19/042
See application file for complete search history.

(56) References Cited

U.S. PATENT DOCUMENTS 10,474,622 B1* 11/2019 Wietfeldt ............ G06F 13/4295
2006/0059283 A1* 3/2006 Borst .................. G05B 19/042
710/107
(Continued)

FOREIGN PATENT DOCUMENTS

JP 2015176369 10/2015
WO 03001306 1/2003
(Continued)

OTHER PUBLICATIONS

"International Search Report (Form PCT/ISA/210) of PCT/JP2019/011873", dated May 7, 2019, with English translation thereof, pp. 1-4.
(Continued)

*Primary Examiner* — Razu A Miah
(74) *Attorney, Agent, or Firm* — JCIPRNET

(57) ABSTRACT

A control system includes a master device and one or a plurality of slave devices connected to the master device via a field network. In a storage unit of each slave device, a node address is arranged in a unique region for each model of the slave devices. The control system further includes an information providing part which provides, in any slave device, information for specifying the region in which the node address is stored in the storage unit to the master device.

7 Claims, 13 Drawing Sheets

(51) Int. Cl.
    *G05B 19/042*     (2006.01)
    *H04L 67/06*     (2022.01)
    *H04L 67/1097*     (2022.01)

(56) References Cited

U.S. PATENT DOCUMENTS

| | | | | |
|---|---|---|---|---|
| 2006/0179120 | A1* | 8/2006 | Kegoya | G05B 19/05 709/217 |
| 2009/0287837 | A1* | 11/2009 | Felsher | G06Q 10/10 709/229 |
| 2011/0119507 | A1* | 5/2011 | Reidt | G06F 1/26 713/300 |
| 2013/0275659 | A1* | 10/2013 | Langas | G06F 3/0664 711/103 |
| 2014/0047056 | A1* | 2/2014 | Tahara | H04L 41/046 709/208 |
| 2014/0351359 | A1* | 11/2014 | Grocutt | G06F 13/4282 709/209 |
| 2015/0350134 | A1* | 12/2015 | Yang | G06Q 10/107 709/206 |
| 2016/0254925 | A1* | 9/2016 | Riedel | G06F 13/4068 710/110 |
| 2017/0201850 | A1* | 7/2017 | Raleigh | G06F 3/0482 |
| 2017/0308051 | A1* | 10/2017 | Taniguchi | G06Q 10/107 |
| 2018/0013578 | A1* | 1/2018 | Gozloo | G06F 3/0619 |

FOREIGN PATENT DOCUMENTS

| | | |
|---|---|---|
| WO | 2012124163 | 9/2012 |
| WO | 2018008094 | 1/2018 |

OTHER PUBLICATIONS

"Written Opinion of the International Searching Authority (Form PCT/ISA/237) of PCT/PCT/JP2019/011873", dated May 7, 2019, with English translation thereof, pp. 1-8.

ANONYMOUS, "EthrtCAT—The Ethernet Fieldbus," Dec. 31, 2009, pp. 1-86, Available at: http://www.ethercat.org/pdf/english/EtherCAT_Introduction_0905.pdf.

Mladen Knezic et al., "Increasing EtherCAT performance using frame size optimization algorithm," ETFA 2011 IEEE 16th Conference On, Sep. 2011, pp. 1-4.

"Search Report of Europe Counterpart Application", dated Nov. 24, 2021, p. 1-p. 10.

* cited by examiner

```
<?xml version="1.0" encoding="utf-8"?>
<EtherCATInfo xmlns:xsi="http://www.w3.org/2001/XMLSchema-instance"
  xsi:noNamespaceSchemaLocation="EtherCATInfo.xsd"
  Version="Schema version (1.8)">
 <Vendor FileVersion="001">
  <Id>#x83</Id>
  <Name LcId="1033">OMRON Corporation</Name>
       ⋮
     <ResponseTimeout>2000</ResponseTimeout>
    </Timeout>
   </Mailbox>
   <IdentificationAdo>#x0012</IdentificationAdo>          ──602
  </Info>
  <GroupType>Digital IO</GroupType>
  <Profile>
       ⋮
```

FIG. 7

CONTROL SYSTEM AND CONTROL METHOD

CROSS-REFERENCE TO RELATED APPLICATION

This application is a 371 application of the International PCT application serial no. PCT/JP2019/011873, filed on Mar. 20, 2019, which claims the priority benefit of Japanese Patent Application No. 2018-071312, filed on Apr. 3, 2018. The entirety of each of the above-mentioned patent applications is hereby incorporated by reference herein and made a part of this specification.

BACKGROUND

Technical Field

The present invention relates to a control system including slave devices connected through a network and a control method in the control system.

Related Art

In the factory automation (FA) field, a control system including a control apparatus and one or a plurality of slave devices connected through a network to the control apparatus is in widespread use. The slave device is assumed to be an input/output apparatus, an apparatus that provides an arbitrary processing function such as robot control or a visual sensor, or other apparatuses. Usually, the control apparatus functions as a master device.

Because the control apparatus exchanges data with each slave device, it is necessary to specify each slave device. Information for specifying the slave device is called a network ID (identification information), a network address, and a node address.

The number and the model of the slave devices are appropriately determined according to a control target and may be added or changed afterwards. In this case, the information for specifying each slave device also needs to be updated appropriately.

For example, Japanese Patent Application Laid-Open No. 2015-176369 (patent literature 1) discloses a configuration in which a group name, a device name, a network address and a node address can be arbitrarily set for each device on a user interface screen for setting a group provided by a support apparatus.

SUMMARY

Problems to be Solved

In the control system, an industrial network is often used in which an arrival time is guaranteed. In this industrial network, a procedure for exchanging various kinds of information with the control apparatus is predetermined.

In order to follow this procedure, prior information may be required for the control apparatus that functions as the master device, but because an amount of information that can be stored in the control apparatus is limited, settings via the network may be limited.

The present invention has an object to solve the aforementioned problems, and provides a configuration capable of providing various functions including a setting function even when the master device lacks prior information.

Means to Solve Problems

The control system according to an example of the disclosure includes a master device and one or a plurality of slave devices connected to the master device via a field network. Each of the one or a plurality of slave devices includes a storage unit storing a node address for identifying each slave device in the field network and format information indicating a model of each slave device. In the storage unit, the node address is arranged in a unique region for each model of the slave devices. The master device is capable of accessing the storage unit of any slave device connected to the field network. The control system further includes an information providing part which provides, in any slave device, information for specifying the region in which the node address is stored in the storage unit to the master device.

According to the disclosure, the node address can be acquired from each slave device even when the master device lacks prior information, and thus various functions can be provided.

In the above disclosure, the information providing part includes a support apparatus connected to the master device. The support apparatus searches a slave information file corresponding to format information acquired from a target slave device among slave information files for each model of the slave device stored in advance, and provides, based on the searched slave information file, the information for specifying the region in which the node address is stored to the master device.

According to the disclosure, because the information for specifying the region in which the node address is stored can be provided to the master device from the support apparatus, the various functions using the node address can be provided even when the master device has few resources.

In the above disclosure, the master device may determine whether the slave information file searched by the support apparatus is suitable for the target slave device, and acquire, when the slave information file is determined to be not suitable, a slave information file suitable for the target slave device from a slave information file server by sending the format information to the slave information file server managing the slave information file.

According to the disclosure, even if the slave information file stored in the support apparatus is old, the information for specifying the region in which the node address is stored can be appropriately provided to the master device.

In the above disclosure, the master device may determine whether the slave information file is suitable for the target slave device based on a file name of the slave information file searched by the support apparatus.

According to the disclosure, because the file name of the slave information file is used instead of using the entire slave information file, communication traffic can be reduced and processing can be speeded up.

In the above disclosure, the information providing part may include a machine management server which manages the slave information file for each model of the slave device, and the master device may receive, by sending the format information acquired from any slave device to the machine management server, a response of the information described in a corresponding slave information file and specifying the region in which the node address is stored.

According to the disclosure, the entire system can be made efficient by sharing the machine management server among a plurality of master devices without using the support apparatus or the like.

In the above disclosure, data may be transmitted in the field network according to EtherCAT (registered trademark).

According to the disclosure, data transmission with guaranteed arrival time can be achieved.

In the above disclosure, the slave information file is an EtherCAT slave information (ESI) file.

According to the disclosure, the slave information file according to the standard of EtherCAT can be used.

In the above disclosure, the slave device may include a hardware switch setting a value of the node address.

According to the disclosure, any node address can be set for each slave device without using the support apparatus or the like.

According to another example of the disclosure, a control method is provided which is in a control system including a master device and one or more slave devices connected to the master device via a field network. Each of the one or more slave devices includes a storage unit storing a node address for identifying each slave device in the field network and format information indicating a model of each slave device. In storage unit, the node address is arranged in a unique region for each model of the slave devices. The control method includes a step of providing, in any slave device, information for specifying the region in which the node address is stored in the storage unit to the master device, and a step in which the master device accesses the storage unit of any slave device connected to the field network based on the information for specifying the region in which the node address is stored.

According to the disclosure, the node address can be acquired from each slave device even when the master device lacks prior information, and thus various functions can be provided.

Effect

According to the present invention, a configuration can be provided which is capable of providing various functions including a setting function even when the master device lacks prior information.

BRIEF DESCRIPTION OF THE DRAWINGS

FIG. 7 is a diagram showing a related portion of a slave information file used in the control system according to the embodiment.

DESCRIPTION OF THE EMBODIMENTS

Figure 1:
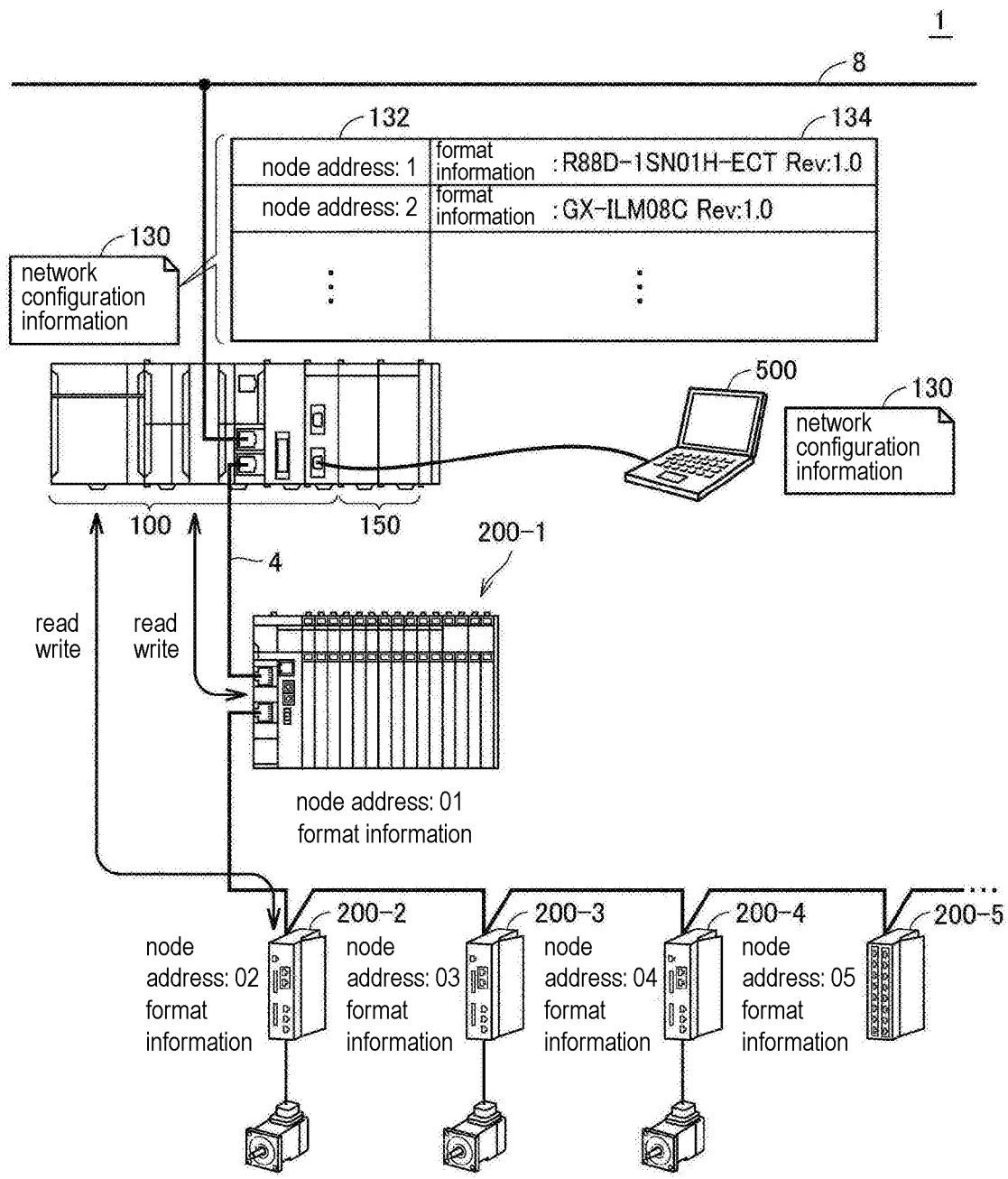
FIG. 1 is a schematic diagram showing an example of an overall configuration of a control system according to the embodiment.

Embodiments of the present invention are described specifically with reference to the drawings. Moreover, the same or corresponding portions in the drawings are denoted by the same reference signs and description thereof is not repeated.

<A. Application Example>

First, an example of a scene to which the present invention is applied is described with reference to FIGS. 1 and 2.

FIG. 1 is a schematic diagram showing an example of an overall configuration of a control system 1 according to the embodiment. With reference to FIG. 1, the control system 1 includes, as main components, a control apparatus 100 that functions as a master device, and one or a plurality of slave devices 200-1, 200-2, . . . (hereinafter also collectively referred to as "slave devices 200") connected to the control apparatus 100 via a field network 4.

In the specification, "field network" is a generic term of communication mediums for achieving data transmission between control apparatuses and is also called a "field bus". As the field network 4, a protocol that guarantees data arrival times between nodes in the network is typically employed. As the protocol that guarantees the data arrival times between nodes, for example, EtherCAT or the like can be employed. Alternatively, EtherNet/IP (registered trademark), DeviceNet (registered trademark), CompoNet (registered trademark), or the like may be employed.

In the following description, a case where EtherCAT is employed as the field network 4 is described as an example. That is, in the field network 4, data is transmitted according to EtherCAT.

In the specification, "master device" is a general term of entities or functions that manage the data transmission in the field network of interest. "Slave device" is a term that is paired with a master device, and is a general term of entities or functions that perform the data transmission in the field network of interest under management of the master device of the field network.

The terms "master device" and "slave device" are terms that define functional division related to the data transmission in the field network, and relationships other than the data transmission are not particularly limited.

The control apparatus 100 executes control of a control target such as equipment or machine by executing a user program as described below. A function unit 150 is connected to the control apparatus 100 and exchanges signals with the control target. The function unit 150 may include an input/output unit, a communication unit, and a special unit (for example, a unit in which a function such as PID control or motion control is implemented). The input/output unit has, for example, one or a plurality of functions among a digital input (DI) function that receives a digital input signal from the control target, a digital output (DO) function that sends a digital output signal to the control target, an analog input (AI) function that receives an analog input signal from the control target, and an analog output (AO) function that sends an analog output signal to the control target.

The control apparatus 100 may be further connected to an information system network 8. Other control apparatus 100 may be connected to the information system network 8, or any information processing apparatus such as a gateway or a database server may be connected to the information system network 8. In addition, a support apparatus 500 can be connected to the control apparatus 100.

The slave device 200 is a generic term of apparatuses that are connected to the control apparatus 100 via a field network and executes predetermined processing on the control target. The slave device 200 may be an apparatus corresponding to the function unit 150 as described above, or may be an apparatus having a higher function than the function unit 150.

In the configuration example shown in FIG. 1, an example is shown in which the slave device 200-1 is a remote IO apparatus, slave devices 200-2, 200-3, and 200-4 are motor drive apparatuses, and a slave device 200-5 is a safety input/output unit. Obviously, any apparatus or device can be employed as the slave device 200.

The control apparatus 100, which is a master device, holds pre-set network configuration information 130. The network configuration information 130 includes a node address 132 and format information 134 for each slave device 200 connected to the field network 4. Moreover, usually, the same network configuration information 130 as the network configuration information 130 stored in the control apparatus 100 is also stored in the support apparatus 500.

In the specification, the "node address" is specific information for identifying each slave device 200 in the field network 4. The "node address" is determined within one field network 4 without overlapping each other.

In the specification, the "format information" is information indicating the model of each slave device 200 and includes, for example, a vendor code (manufacturer identification information), a product model, a revision number, and the like of the slave device 200.

Each slave device 200 stores the node address and the format information, and contents of the node address and the format information can be read out from the master device. That is, each of the slave devices 200 has a non-volatile memory serving as a storage unit that stores the node address and the format information.

The master device can access the storage unit of any slave device 200 connected to the field network 4. For example, the master device can write the node address into the storage unit of each slave device 200.

The master device has a function of collating contents described in the network configuration information 130 and a configuration of the device actually connected to the field network 4 (hereinafter, also referred to as "actual network configuration"). The collation function may be performed by an explicit instruction of a user, or may be performed when the data transmission via the field network 4 is activated.

In collating the network configuration information 130 with the actual network configuration, a determination is made on the match of the node address 132 and the format information 134 of each slave device 200.

Figure 2:
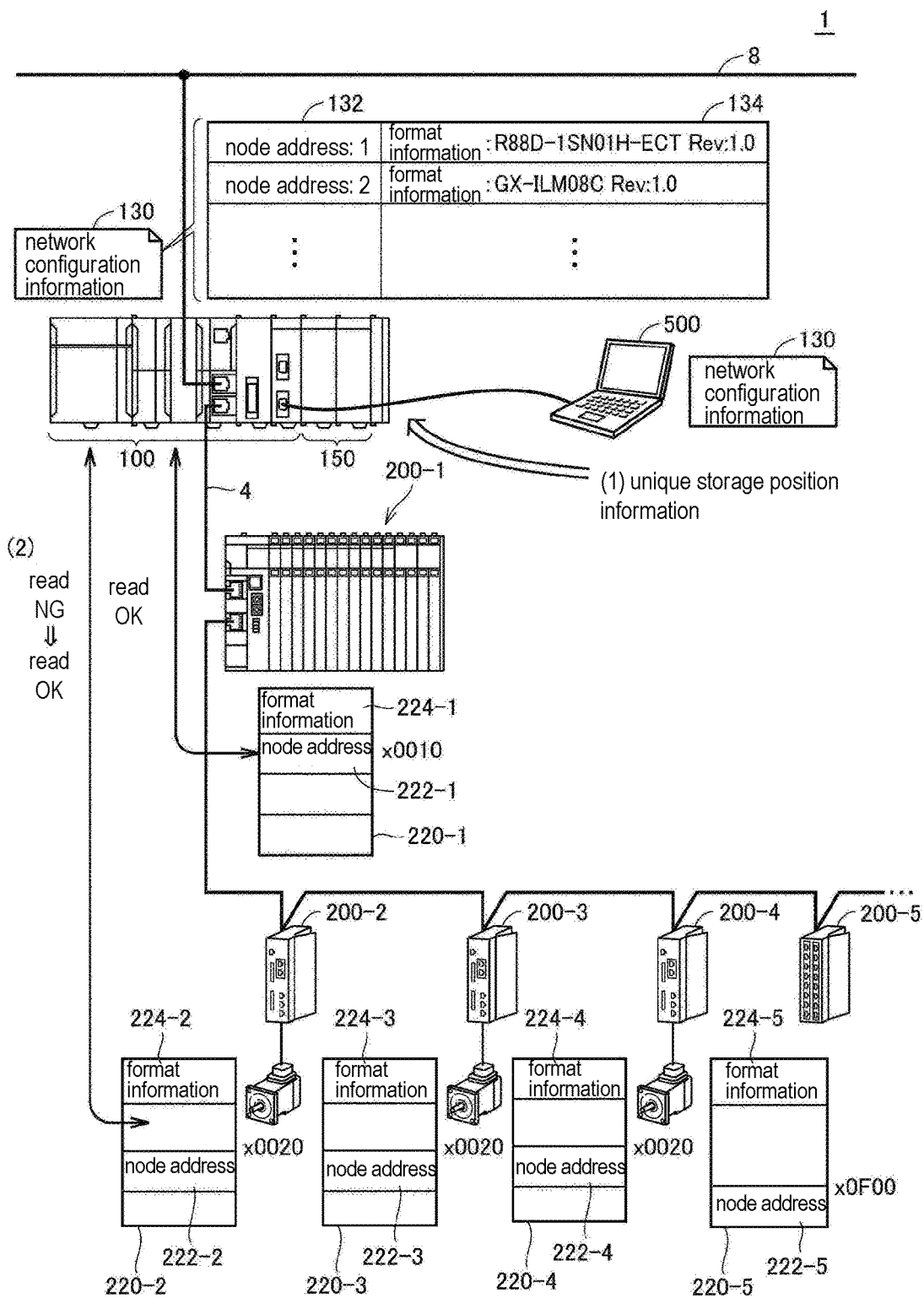
FIG. 2 is a diagram illustrating problems and solving means in the control system according to the embodiment.

FIG. 2 is a diagram illustrating problems and solving means in the control system 1 according to the embodiment. With reference to FIG. 2, the slave devices 200-1 to 200-5 have non-volatile memories 220-1 to 220-5 (hereinafter also collectively referred to as the "non-volatile memory 220") that store node addresses 222-1 to 222-5 (hereinafter also collectively referred to as the "node address 222") and format information 224-1 to 224-5 (hereinafter also collectively referred to as the "format information 224") of respective slave devices.

The master device accesses the non-volatile memory 220 of any slave device 200 among the slave devices 200-1 to 200-5 according to a request from the outside or as necessary to read out information stored in the non-volatile memory 220 or write any information into the non-volatile memory 220.

However, a region in which the node address 222 is stored in the non-volatile memory 220 of the slave device 200 differs depending on the model. That is, in the non-volatile memory 220, the node address 222 is arranged in a unique region for each model of each slave device 200.

In the example shown in FIG. 2, a start address of a region in which the node address 222-1 is stored in the non-volatile memory 220-1 of the slave device 200-1 is "x0010", and a start address of a region in which the node address 222-2 in the non-volatile memory 220-2 of the slave device 200-2 is "x0020".

If the master device does not know the region where the node address 222 is stored in the slave device 200 that is an access destination, the node address cannot be read.

For example, in FIG. 2, a case is shown in which the control apparatus 100, which is a master device, knows the region in which the node address is stored in the slave device 200-1, but does not know the region in which the node address is stored in the slave device 200-2. In this case, the read to acquire the node address 222 from the master device to the slave device 200-2 is NG.

With respect to this problem, the control system 1 according to the embodiment has an information providing function for providing information for specifying the region in which the node address is stored in the storage unit of any slave device 200 (hereinafter, also referred to as the "unique storage position information") to the master device (the control apparatus 100). That is, by providing, to the control apparatus 100 which is the master device, the information (the unique storage position information) about in which region in the non-volatile memory 220 of each slave device 200 the node address 222 is stored, a mechanism is provided which can acquire the node address 222 from any slave device 200.

A more detailed specific example of the control system 1 according to the embodiment is described below.

<B. Hardware Configuration Example>

Next, a hardware configuration example of a main apparatus constituting the control system 1 according to the embodiment is described.

(b1: Control Apparatus 100)

Figure 3:
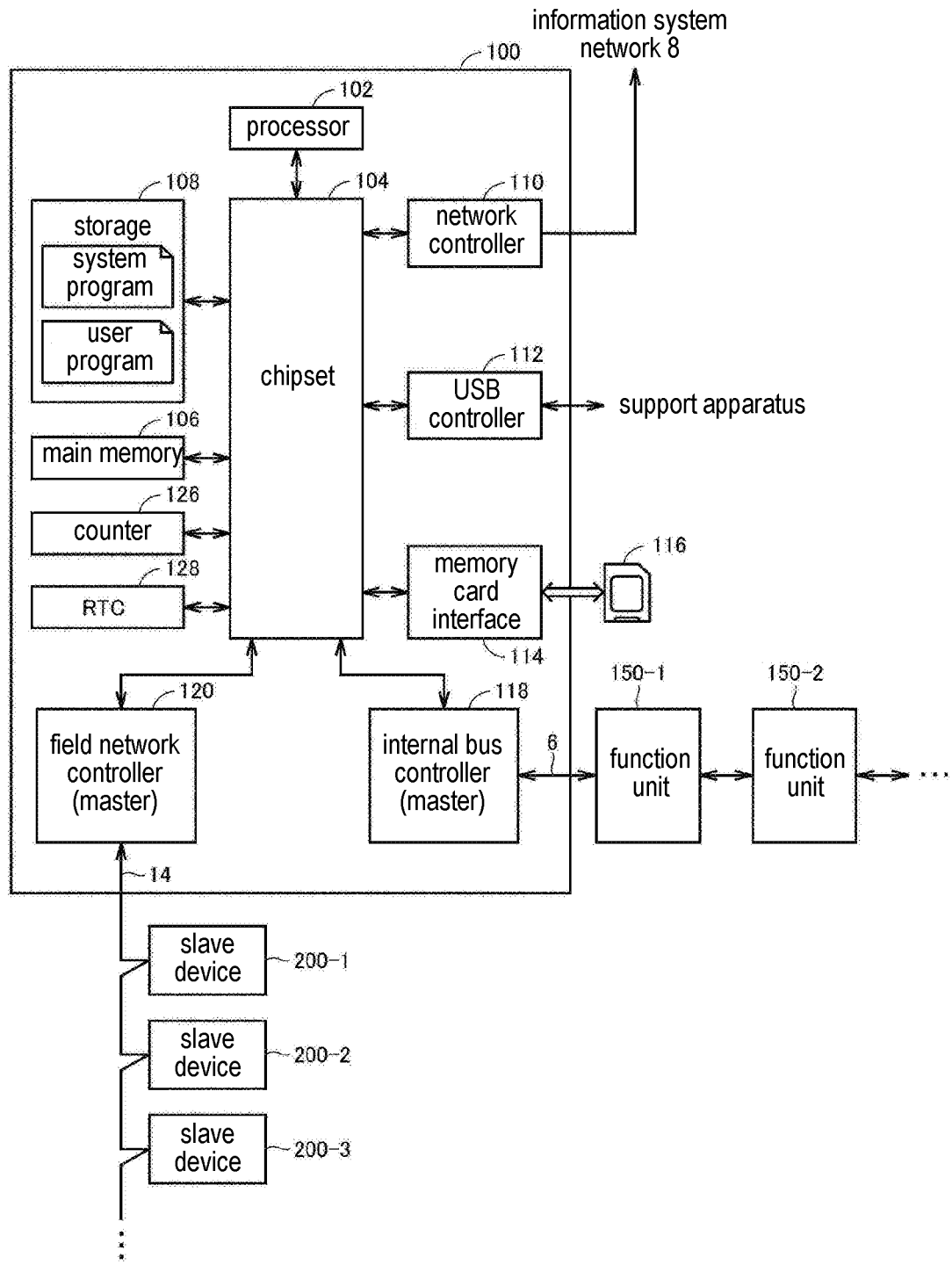
FIG. 3 is a schematic diagram showing an example of a hardware configuration of a control apparatus that constitutes the control system according to the embodiment.

FIG. 3 is a schematic diagram showing the hardware configuration example of the control apparatus 100 constituting the control system 1 according to the embodiment. With reference to FIG. 3, the control apparatus 100 includes a processor 102, a chipset 104, a main memory 106, a storage 108, a network controller 110, a USB (Universal Serial Bus) controller 112, a memory card interface 114, an internal bus controller 118, a field network controller 120, a counter 126, and a Real Time Clock (RTC) 128.

The processor 102 corresponds to a calculation processing unit that executes control calculation and the like, and is constituted by a central processing unit (CPU), a graphics processing unit (GPU), and the like. Specifically, the processor 102 reads programs (for example, a system program and a user program) stored in the storage 108, expands the programs in the main memory 106, and executes the programs, thereby achieving control according to the control target and various kinds of processing as described later.

The main memory 106 is constituted by, for example, a volatile storage apparatus such as a dynamic random access memory (DRAM), a static random access memory (SRAM), or the like. The storage 108 is constituted by, for example, a non-volatile storage apparatus such as a solid state drive (SSD), a Hard Disk Drive (HDD), or the like.

The chipset 104 controls the processor 102 and each device to thereby achieve the processing of the control apparatus 100 as a whole.

In the storage 108, in addition to a system program for achieving basic functions, a user program created according to the control target such as equipment or machine is stored.

The network controller 110 exchanges data with an arbitrary information processing apparatus such as a gateway or a database server via the information system network 8. The USB controller 112 exchanges data with the support apparatus 500 via a USB connection.

The memory card interface 114 is constituted in a manner that a memory card 116 can be attached thereto and detached therefrom, and can write data into the memory card 116 and read various data from the memory card 116.

The counter 126 is used as a time reference for managing execution timing of various programs executed by the control apparatus 100. The counter 126 may be implemented using a high precision event timer (HPET) arranged on a system bus that drives the processor 102, or may be implemented using a dedicated circuit such as an application specific integrated circuit (ASIC), a field-programmable gate array (FPGA), or the like.

The RTC 128 is a kind of counter having a time counting function and provides the current time to the processor 102 and the like.

The internal bus controller 118 corresponds to a communication interface for electrically connecting, via an internal bus 6, one or a plurality of function units 150-1, 150-2, . . . (hereinafter also collectively referred to as "the function unit 150") and the control apparatus 100. The internal bus controller 118 functions as a master device for performing fixed cycle communication via the internal bus 6.

The function unit 150 is a generic term for apparatuses that are connected to the control apparatus 100 and exchange various signals with the control target. The function unit 150 may include an IO unit, a communication unit, and a controller unit that implements special functions such as PID control and motion control. The IO unit has, for example, one or a plurality of functions among a digital input (DI) function that receives a digital input signal from the control target, a digital output (DO) function that sends a digital output signal to the control target, an analog input (AI) function that receives an analog input signal from the control target, and an analog output (AO) function that sends an analog output signal to the control target.

The field network controller 120 corresponds to a communication interface for electrically connecting one or a plurality of slave devices 200-1, 200-2, . . . (the lave device 200) and the control apparatus 100 via the field network 4. The field network controller 120 functions as a master device for performing fixed cycle communication via the field network 4.

FIG. 3 shows a configuration example in which necessary functions are provided by the processor 102 executing the programs; however, some or all of the provided functions may be implemented using a dedicated hardware circuit (for example, ASIC, FPGA, or the like). Alternatively, a main portion of the control apparatus 100 may be achieved using hardware according to a general-purpose architecture (for example, an industrial personal computer based on a general-purpose personal computer). In this case, a virtualization technique may be used to execute a plurality of operating systems (OS) having different purposes in parallel and to execute a required application on each OS.

In addition, a configuration may be employed in which the functions of a display apparatus, a support apparatus, and the like are integrated with the control apparatus 100.

(b2: Slave Device 200)

Figure 4:
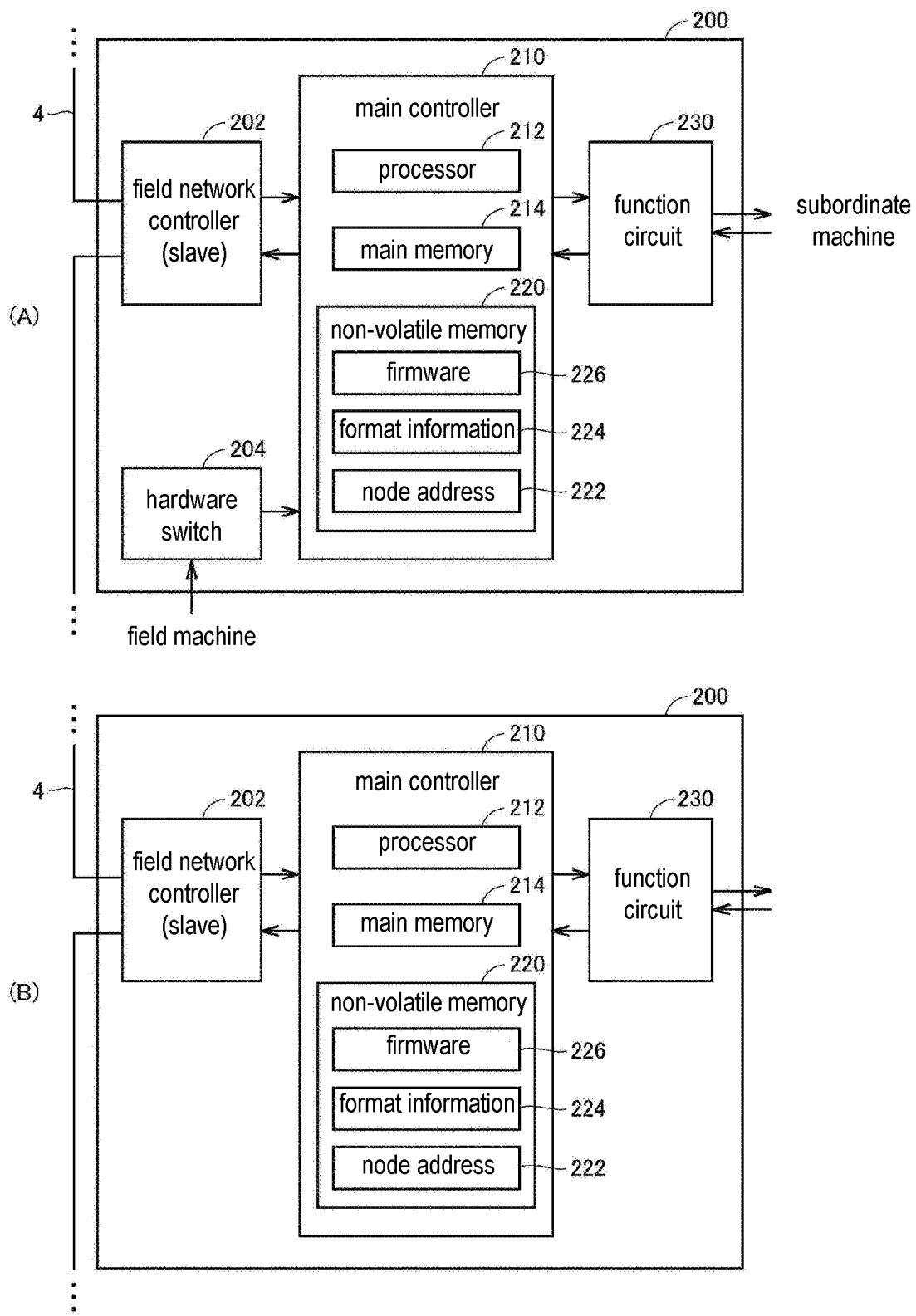
FIG. 4 is a schematic diagram showing a hardware configuration example of a slave device that constitutes the control system according to the embodiment.

FIG. 4 is a schematic diagram showing a hardware configuration example of the slave device 200 constituting the control system 1 according to the embodiment. There are mainly two methods for setting the node address of the slave device 200. One is a method of setting with a hardware switch arranged in the slave device 200, and the other is a method of writing the node address from the support apparatus 500 or the like into a specific region in the non-volatile memory 220 of the slave device 200.

Part (A) of FIG. 4 shows a configuration in which a hardware switch 204 for setting the node address is arranged. The slave device 200 includes a field network controller 202, the hardware switch 204, a main controller 210, and a function circuit 230.

The field network controller 202 corresponds to a communication interface for electrically connecting the control apparatus 100 (the master device) and the slave device 200 via the field network 4. The field network controller 202 functions as a communication slave for exchanging data under the management of the master device.

The main controller 210 is a circuit in charge of main control of the slave device 200, and includes, for example, a processor 212, a main memory 214, and the non-volatile memory 220.

The non-volatile memory 220 stores firmware 226 executed by the processor 212, the node address 222, and the format information 224.

The hardware switch 204 is a device for setting a value of the node address of each slave device 200. For example, the hardware switch 204 is constituted by a rotary switch, a DIP switch, or the like, and the node address can be set by a user operation. The main controller 210 recognizes the node address set by the user by acquiring a signal value according to a setting state of the hardware switch 204. That is, the hardware switch 204 is an input device for determining an ID for identifying each slave device 200.

Part (B) of FIG. 4 shows a configuration example of the slave device 200 in which the hardware switch 204 is omitted. For the slave device 200 shown in part (B) of FIG. 4, the node address can be set from the support apparatus 500.

The function circuit 230 provides a unique function of the slave device 200. For example, when the slave device 200 is a motor drive apparatus, the function circuit 230 includes an inverter circuit, a control circuit, and the like. In addition, when the slave device 200 is a remote IO apparatus, the function circuit 230 includes a communication interface for exchanging data with the connected function unit via the internal bus.

Although FIG. 4 shows the main controller 210 including the processor 212, all or some of the functions provided by the main controller 210 may be implemented using a dedicated hardware circuit (for example, ASIC, FPGA, or the like).

(b3: Support Apparatus 500)

Figure 5:
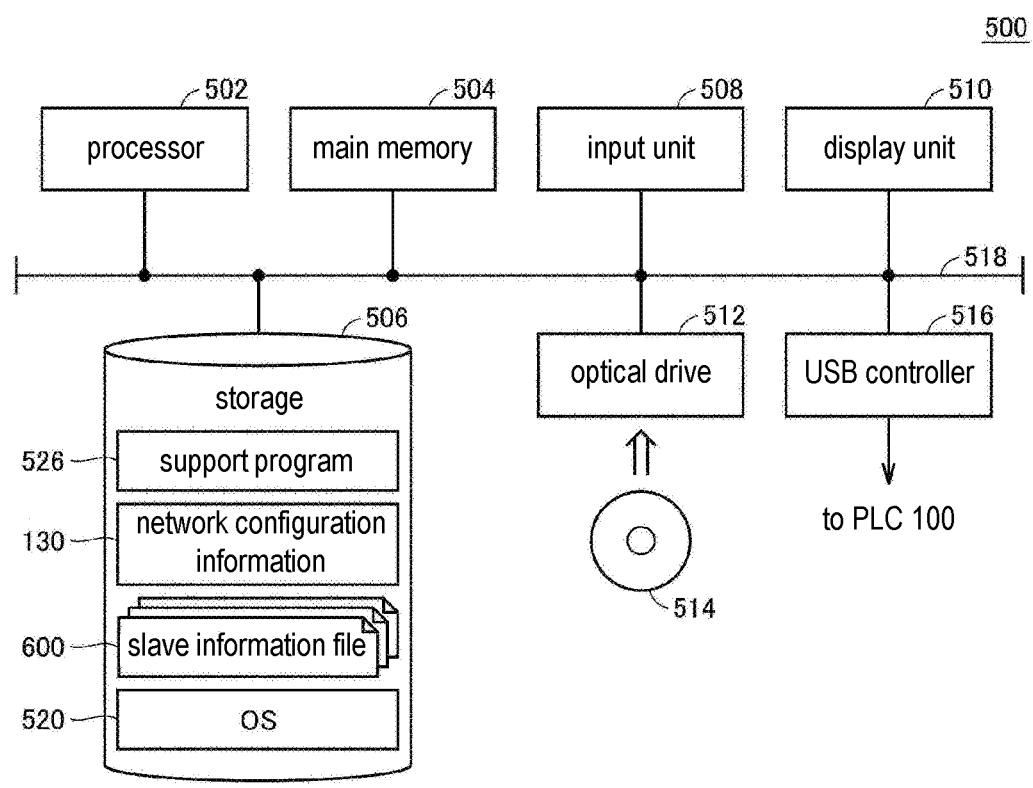
FIG. 5 is a schematic diagram showing a hardware configuration example of a support apparatus that constitutes the control system according to the embodiment.

FIG. 5 is a schematic diagram showing a hardware configuration example of the support apparatus 500 constituting the control system 1 according to the embodiment. The support apparatus 500 is achieved, for example, by executing a program using hardware according to a general-purpose architecture (for example, a general-purpose personal computer).

With reference to FIG. 5, the support apparatus 500 includes a processor 502, a main memory 504, a storage 506, an input unit 508, a display unit 510, an optical drive 512, and a USB controller 516. These components are connected via a processor bus 518.

The processor 502 is constituted by a CPU, a GPU, and the like, and reads programs (for example, an OS 520 and a support program 526) stored in the storage 506, expands the programs in the main memory 504, and executes the programs, thereby achieving various kinds of processing described later.

The main memory 504 is constituted by, for example, a volatile storage apparatus such as a DRAM, a SRAM, or the like. The storage 506 is constituted by, for example, a non-volatile storage apparatus such as a HDD, a SSD, or the like.

The storage 506 stores the support program 526 for providing a function as the support apparatus 500, in addition to the OS 520 for achieving the basic function. Furthermore, the storage 506 stores a slave information file 600 and the network configuration information 130. The acquisition and use of these pieces of information is described later.

The input unit 508 is constituted by a keyboard, a mouse and the like, and receives a user operation. The display unit 510 is constituted by a display, various indicators, a printer, and the like, and outputs a processing result from the processor 502.

The USB controller 516 controls the exchange of data with the control apparatus 100 and the like via a USB connection.

The support apparatus 500 has the optical drive 512, and a program stored in a recording medium 514 (for example, an optical recording medium such as a digital versatile disc (DVD) or the like) which non-transitorily stores a computer-readable program is read from the recording medium 514 and installed in the storage 506 or the like.

The program executed by the support apparatus 500 may be installed via the computer-readable recording medium 514, or may be installed by being downloaded from a server device or the like on the network. In addition, the function provided by the support apparatus 500 according to the embodiment may also be achieved by utilizing a portion of a module provided by the OS.

FIG. 5 shows a configuration example in which the processor 502 executes programs to thereby provide necessary functions as the support apparatus 500. However, some or all of the provided functions may be implemented using a dedicated hardware circuit (for example, an ASIC, a FPGA, or the like).

<C. Access from Master Device to Slave Device>

Next, the processing in which the master device (the control apparatus 100) accesses the slave device 200 and refers to the node address is described.

Figure 6:
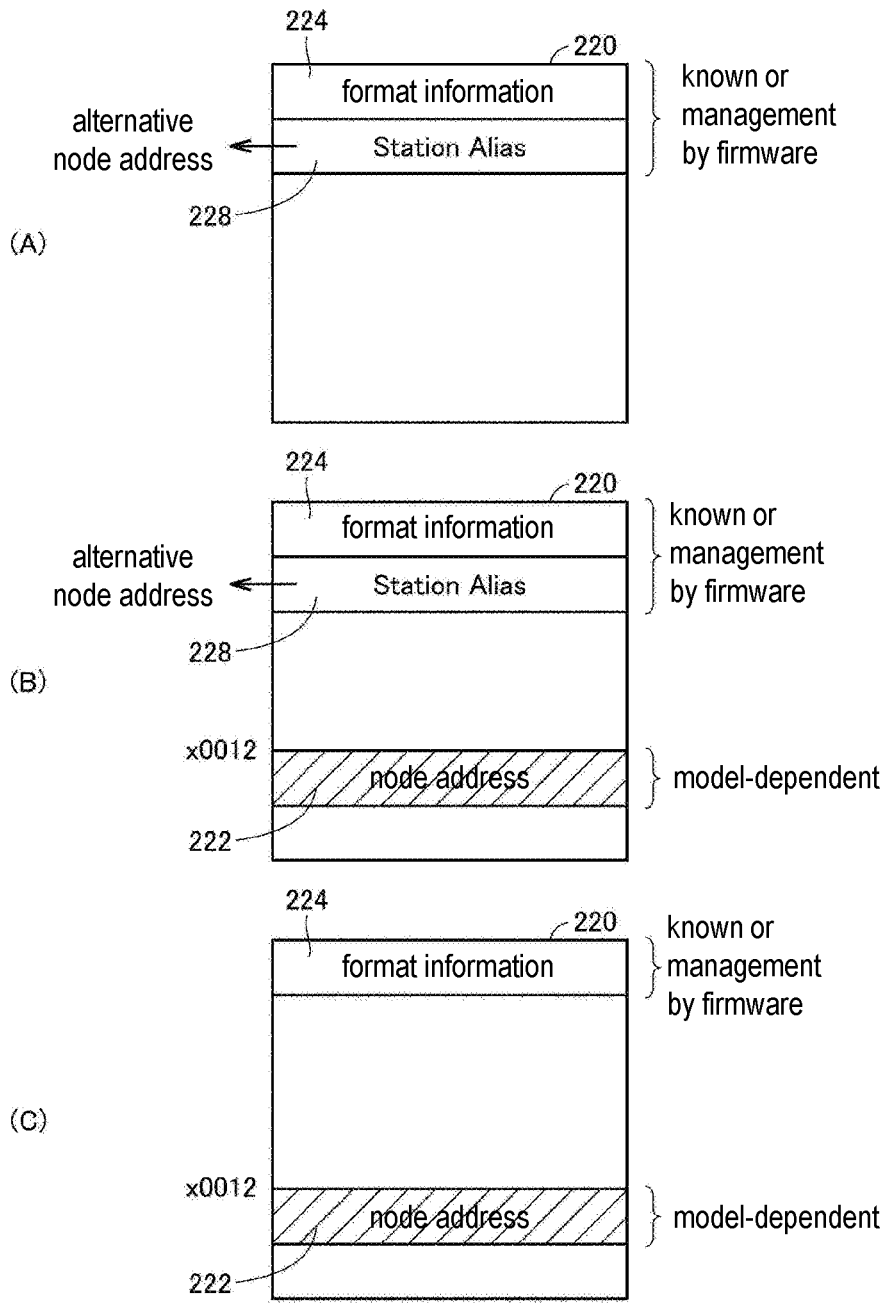
FIG. 6 is a schematic diagram showing an example of storing information to a non-volatile memory 220 of the slave device that constitutes the control system according to the embodiment.

FIG. 6 is a schematic diagram showing an example of storing the information to the non-volatile memory 220 of the slave device 200 that constitutes the control system 1 according to the embodiment.

Part (A) of FIG. 6 shows an example of the non-volatile memory 220 of the slave device 200 in which the hardware switch 204 for setting the node address is not arranged. In the non-volatile memory 220 shown in part (A) of FIG. 6, the region in which the format information 224 is stored and a region in which StationAlias 228 is stored are defined.

The StationAlias 228 is a node address (alternative node address) that is prepared separately from the node address set by hardware by the hardware switch 204 and is set by software. In the StationAlias 228, an arbitrary node address is set according to a command from the master device or the support apparatus 500 connected to the master device.

In the slave device 200, the master device recognizes the node address set as the StationAlias 228 as the node address of the slave device 200.

The master device can access the region in which the format information 224 is stored and the region in which the StationAlias 228 is stored for any of the slave devices 200. More specifically, in the non-volatile memory 220 of each slave device 200, the region in which the format information 224 is stored and the region in which the StationAlias 228 is stored are common (known) to any of the slave devices 200. Alternatively, the region in which the format information 224 is stored and the region in which the Station Alias 228 is stored are managed in an abstracted state by the firmware 226 of each slave device 200. By being abstracted, even if the region in which the information is actually stored in the non-volatile memory 220 is different, the difference in region can be absorbed from the viewpoint of the master device.

Part (B) of FIG. 6 shows an example of the non-volatile memory 220 of the slave device 200 in which the hardware switch 204 for setting the node address is arranged. In the non-volatile memory 220 shown in part (B) of FIG. 6, as compared with the non-volatile memory 220 shown in part (A) of FIG. 6, a region for storing the value (the node address 222) set by the hardware switch 204 is arranged.

In the non-volatile memory 220 of the slave device 200 according to the embodiment, the region in which the node address 222 is stored is model-dependent and differs for each model. The region in which the node address 222 set by the hardware switch 204 is stored can be specified by the slave information file defined for each model.

In EtherCAT, this slave information file is referred to as an EtherCAT slave information file (ESI file).

FIG. 7 is a diagram showing a related portion of the slave information file 600 used in the control system 1 according to the embodiment. With reference to FIG. 7, an ESI file, which is an example of the slave information file 600, describes information about the slave device 200 and is prepared for each model of the slave device 200. The ESI file is typically described in an extensible markup language (XML) format.

FIG. 7 shows a description portion 602 of the unique storage position information which is described in the ESI file and specifies the region where the node address 222 is stored. With reference to the ESI file shown in FIG. 7, it can be seen that the node address 222 is stored in the region where a register address of the non-volatile memory 220 of the slave device 200 is started from "x0012".

In the control system 1 according to the embodiment, with reference to the slave information file 600 (typically, the ESI file) as shown in FIG. 7, a value of the node address 222 set in a target slave device 200 can be read.

However, the ESI file exists for each model of the slave device 200, and even if the same model is used, ESI files may be prepared respectively according to revisions or the like.

Due to resource constraints or the like, it is difficult for the control apparatus 100 serving as a master device to refer to all the ESI files. As a result, the control apparatus 100 serving as a master device cannot acquire the node address 222 depending on the model of the slave device 200 connected to the field network 4 managed by the control apparatus 100, and the match between the network configuration information 130 defined in advance and the actual network configuration cannot be collated in some cases.

Therefore, in the control system 1 according to the embodiment, when the slave device 200 of interest stores the node address 222 set by the hardware switch 204 in the non-volatile memory 220, the node address 222 can be read from the master device by providing the position where the 222 is stored (the unique storage position information) to the control apparatus 100, which is the master device.

As a method of providing the unique storage position information to the control apparatus 100, any method can be used, and the following three methods are proposed as typical examples.

<D. Embodiment 1>

First, as Embodiment 1, a configuration is described in which the support apparatus 500 connected to the control apparatus 100 provides the unique storage position information to the control apparatus 100. That is, in Embodiment 1, the support apparatus 500 connected to the control apparatus 100 serving as a master device achieves the function of providing the unique storage position information to the master device.

Figure 8:
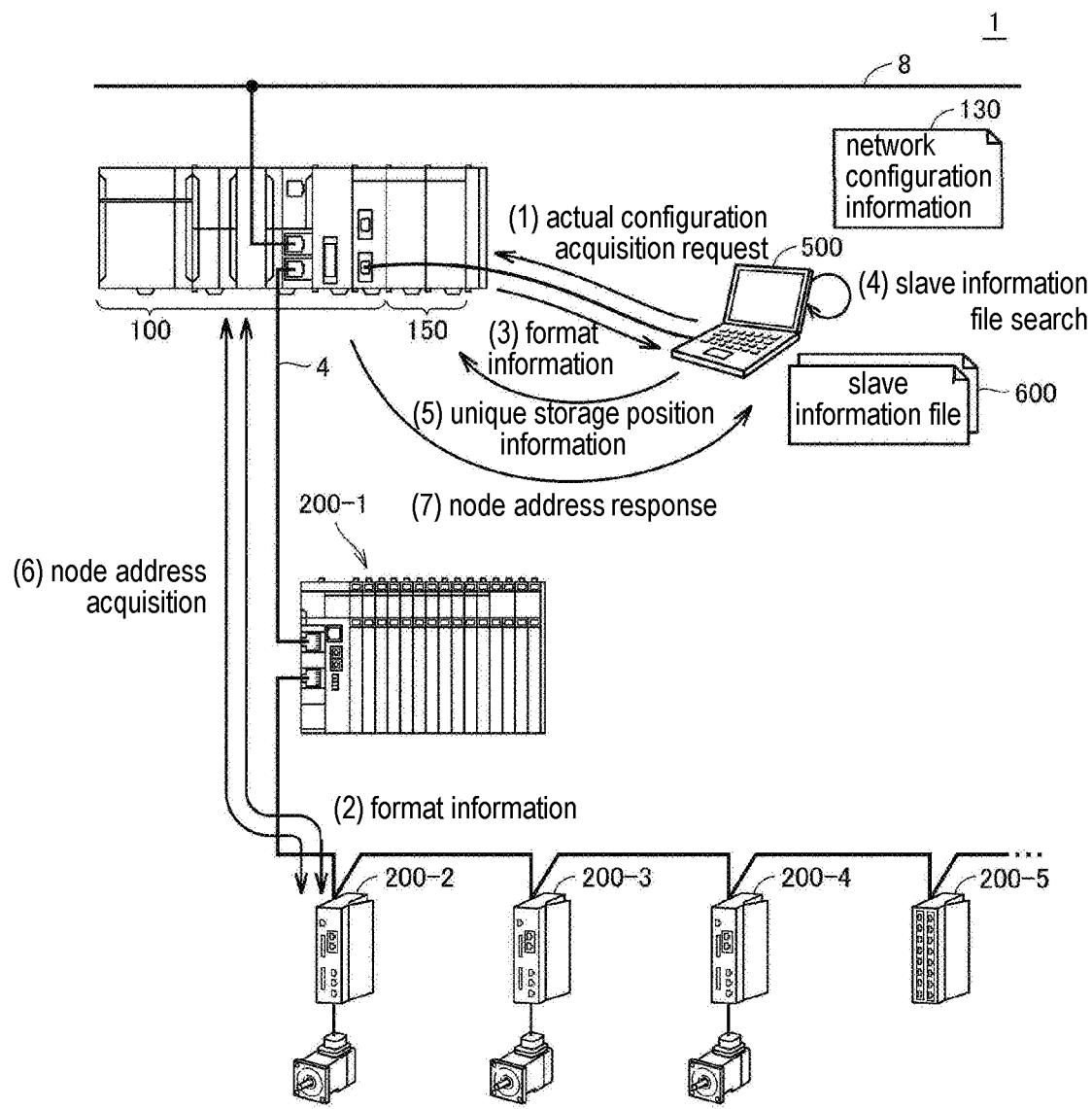
FIG. 8 is a diagram illustrating a processing procedure of acquiring a node address in the control system according to Embodiment 1.

FIG. 8 is a diagram for illustrating a processing procedure of acquiring the node address in the control system 1 according to Embodiment 1. With reference to FIG. 8, the support apparatus 500 is connected to the control apparatus 100, and the support apparatus 500 stores one or a plurality of slave information files 600 in advance.

First, the support apparatus 500 requires the control apparatus 100 to acquire the actual network configuration ((1) actual configuration acquisition request). In response to the actual configuration acquisition request from the support apparatus 500, the control apparatus 100 accesses the target slave device 200 to acquire the format information 224 ((2) format information). The control apparatus 100 may acquire the StationAlias 228 in addition to the format information 224. Then, the control apparatus 100 sends the format information 224 acquired from the target slave device 200 to the support apparatus 500 ((3) format information).

The support apparatus 500 searches the slave information file 600 stored in advance using the format information 224 from the control apparatus 100 as a key ((4) slave information file search). The format information 224 includes the vendor code, the product model, the revision number, and the like of each slave device 200. All the information included in the format information 224 may be used for the search, or only part of the information may be used for the search.

When the support apparatus 500 finds the slave information file 600 corresponding to the format information serving as the key, the support apparatus 500 sends the unique storage position information to the control apparatus 100 with reference to the contents of the slave information file 600 ((5) unique storage position information).

When notification of the unique storage position information is received from the support apparatus 500, the control apparatus 100 acquires the node address from the non-volatile memory 220 of the target slave device 200 according to the notified unique storage position information ((6) node address acquisition). Finally, the control apparatus 100 responds to the support apparatus 500 with the acquired node address ((7) node address response).

As described above, in Embodiment 1, the support apparatus 500 provides the unique storage position information to the master device based on the information that can be acquired in the master device (the control apparatus 100). That is, the support apparatus 500 searches the slave information file 600 for each model of the slave device 200 stored in advance for the slave information file 600 corresponding to the format information acquired from the target slave device 200. Then, the support apparatus 500 provides the information (the unique storage position information) for specifying the region in which the node address is stored to the master device (the control apparatus 100) based on the searched slave information file 600.

By employing this configuration, appropriate unique storage position information can be provided to the master device even when the control apparatus 100 serving as a master device has severe resource constraints.

Figure 9:
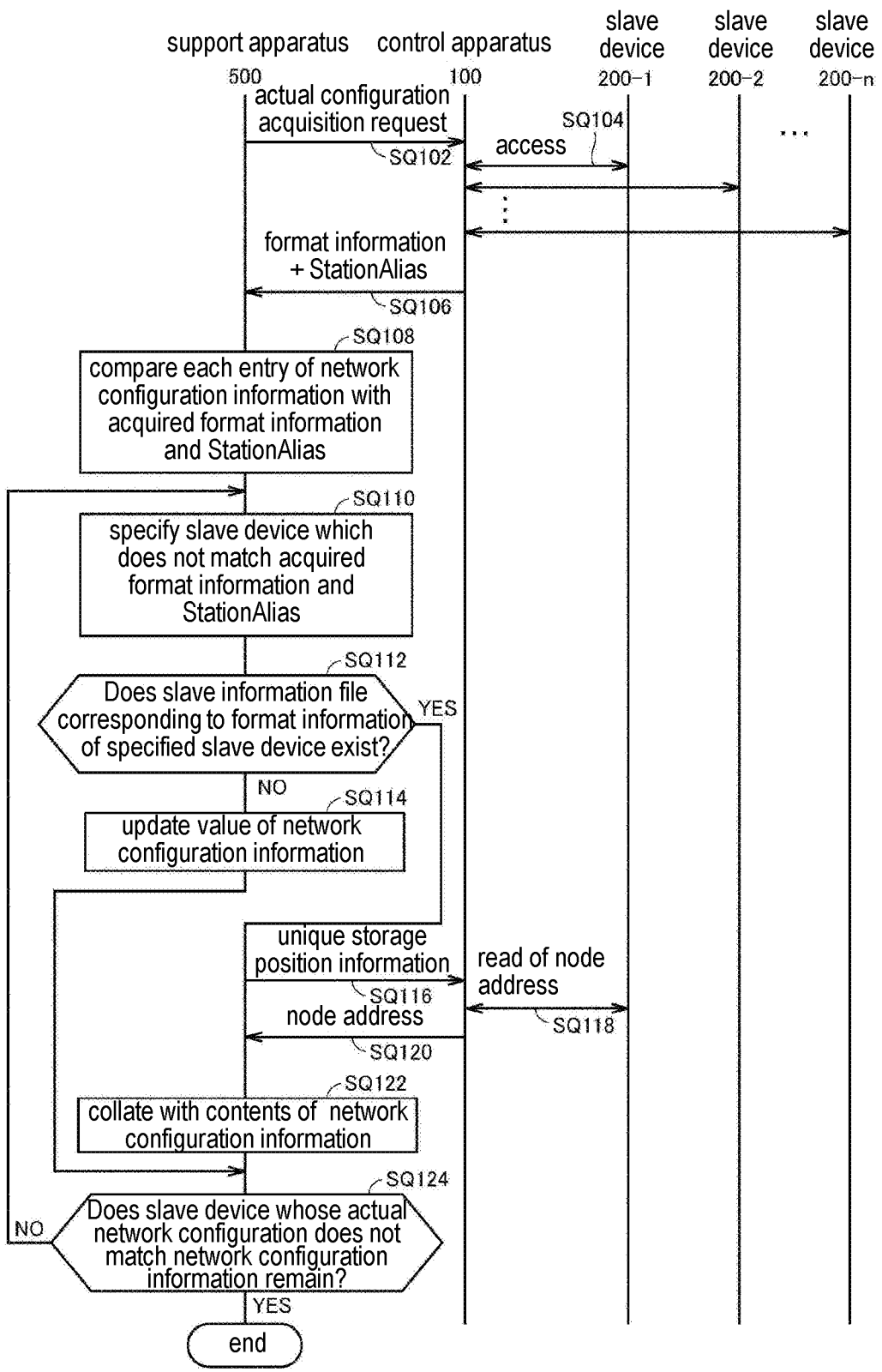
FIG. 9 is a sequence diagram showing the processing procedure of acquiring the node address in the control system according to Embodiment 1.

FIG. 9 is a sequence diagram showing a processing procedure of acquiring the node address in the control system 1 according to Embodiment 1. With reference to FIG. 9, the support apparatus 500 sends an actual configuration acquisition request related to the slave device 200 connected to the field network 4 to the control apparatus 100 (sequence SQ102).

The control apparatus 100 sequentially accesses each slave device 200 connected to the field network 4 in accordance with the actual configuration acquisition request from the support apparatus 500, acquires the format information 224 and the StationAlias 228 (sequence SQ104), and responds to the support apparatus 500 with the acquired result (sequence SQ106).

The support apparatus 500 compares each entry of the pre-set network configuration information 130 with the format information 224 and the StationAlias 228 (alternative node addresses) acquired from the control apparatus 100 (sequence SQ108).

The support apparatus 500 specifies, in the entry included in the network configuration information 130, a slave device 200 which does not match the format information 224 and the StationAlias 228 (the alternative node addresses) acquired from the control apparatus 100 (that is, a slave device 200 in which an actual network configuration does not match the network configuration information 130) (sequence SQ110), searches the slave information file 600, and determines whether the slave information file 600 corresponding to the format information 224 of the specified slave device 200 exists (sequence SQ112).

If the slave information file 600 corresponding to the format information 224 of the specified slave device 200 does not exist (NO in sequence SQ112), the support apparatus 500 updates the value of the network configuration information 130 by taking the value of the StationAlias 228 of the specified slave device 200 as the node address (sequence SQ114). Then, the processing of sequence SQ124 is executed.

On the other hand, when the slave information file 600 corresponding to the format information 224 of the specified slave device 200 exists (YES in sequence SQ112), the support apparatus 500 sends the unique storage position information described in the slave information file 600 to control apparatus 100 (sequence SQ116). Then, the control apparatus 100 accesses the target slave device 200, reads the node address 222 stored in the non-volatile memory 220 according to the unique storage position information from the support apparatus 500 (sequence SQ118), and responds to the support apparatus 500 with the read node address 222 (sequence SQ120). The support apparatus 500 uses the support apparatus 500 from the control apparatus 100 to collate with the contents of the network configuration information 130 (sequence SQ122).

Subsequently, the support apparatus 500 determines whether the slave device 200 whose actual network configuration does not match the network configuration information 130 still remains (sequence SQ124), and if the slave device 200 still remains (YES in sequence SQ124), the processing of sequence SQ110 and thereafter is repeated.

On the other hand, if the slave device 200 no more remains (NO in sequence SQ124), the processing ends.

By the procedure described above, the support apparatus 500 can collate the network configuration information 130 with the actual network configuration.

<E. Embodiment 2>

In the above Embodiment 1, the example has been described in which the unique storage position information is acquired with reference to the slave information file 600 stored in the support apparatus 500. In reality, the revision or the like of the slave device 200 may be updated, and the slave information file 600 stored in the support apparatus 500 is not always the latest version.

Therefore, in Embodiment 2, an example is described in which a slave information file server that manages the slave information file 600 is prepared and the unique storage position information is acquired while the slave information file server is also used.

That is, when the slave information file 600 held by the support apparatus 500 is older than the slave device 200 actually connected, the control apparatus 100 may access an external server to acquire a latest slave information file 600. By employing this example, the unique storage position information suitable for the actually connected slave device 200 can be reliably acquired.

Figure 10:
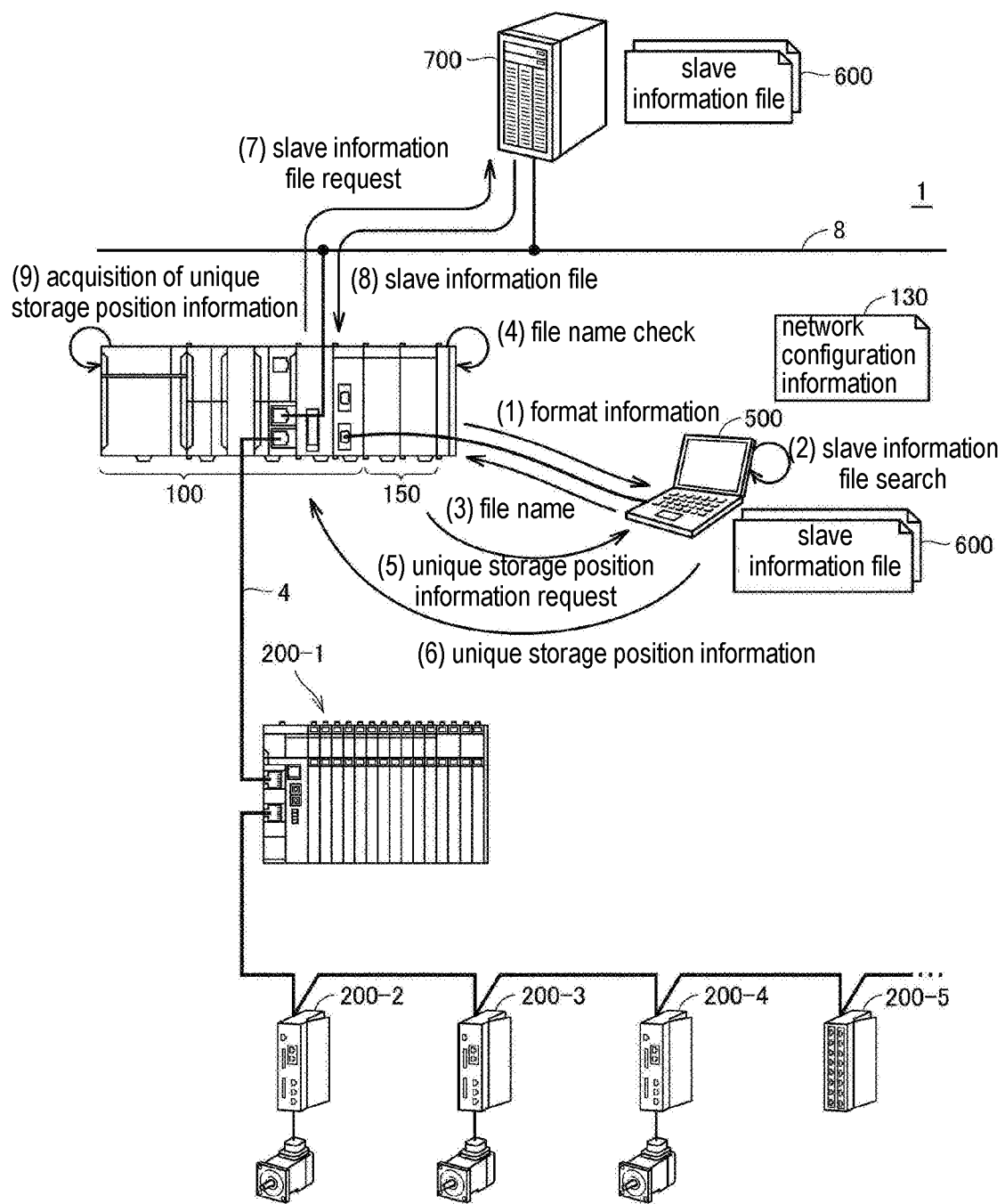
FIG. 10 is a diagram illustrating a processing procedure of acquiring a node address in a control system according to Embodiment 2.

FIG. 10 is a diagram for illustrating a processing procedure of acquiring a node address in the control system 1 according to Embodiment 2. In FIG. 10, description of the same processing as that shown in FIG. 8 is omitted.

With reference to FIG. 10, the support apparatus 500 is connected to the control apparatus 100, and the support apparatus 500 stores one or a plurality of slave information files 600 in advance. Furthermore, a slave information file server 700 that manages the slave information file 600 is connected to the information system network 8. The slave information file server 700 appropriately collects and stores the slave information file 600 provided by a vendor (manufacturer or seller) of the slave device 200.

First, the control apparatus 100 responds to the support apparatus 500 with the format information acquired from the slave device 200 connected to the field network 4 ((1) format information).

The support apparatus 500 searches the slave information file 600 stored in advance using the format information 224 from the control apparatus 100 as a key ((2) slave information file search), and when the slave information file 600 corresponding to the format information serving as the key is found, the support apparatus 500 sends information (typically, a file name) specifying the slave information file 600 to the control apparatus 100 ((3) file name).

In this example, the file name of the slave information file 600 includes at least the contents of the product model and revision number, and the corresponding slave device 200 can be specified only by the file name.

The control apparatus 100 determines, based on the file name of the slave information file 600 from the support apparatus 500, whether the slave information file 600 included in the support apparatus 500 corresponds to the target slave device 200 ((4) file name check).

When the slave information file 600 included in the support apparatus 500 corresponds to the target slave device 200, the control apparatus 100 requests the support apparatus 500 to send the unique storage position information ((5) unique storage position information request). With respect to the request from the control apparatus 100, the support apparatus 500 responds to the control apparatus 100 with the unique storage position information described in the slave information file 600 that has been searched previously ((6) unique storage position information).

On the other hand, when the slave information file 600 included in the support apparatus 500 does not correspond to the target slave device 200, the control apparatus 100 requires the slave information file 600 corresponding to the target slave device 200 to the slave information file server 700 ((7) slave information file request). In the request for the slave information file 600, the format information 224 of the target slave device 200 and the like are sent to the slave information file server 700. The slave information file server 700 responds to the control apparatus 100 with the corresponding slave information file 600 with respect to the request from the control apparatus 100 ((8) slave information file). Then, the control apparatus 100 acquires the unique storage position information described in the slave information file 600 acquired from the slave information file server 700 ((9) acquisition of unique storage position information).

Moreover, data may be exchanged between the control apparatus 100 and the slave information file server 700 by using file transfer protocol (FTP) or the like.

As described above, in Embodiment 2, the master device (the control apparatus 100) determines whether the slave information file 600 searched by the support apparatus 500 is suitable for the target slave device 200. Then, when the master device (the control apparatus 100) determines that the slave information file 600 is not suitable for the target slave device 200, the slave information file 600 suitable for the target slave device 200 is acquired from the slave information file server 700 by sending the format information 224 to the slave information file server 700 that manages the slave information file 600. Typically, the master device (the control apparatus 100) determines, based on the file name of the slave information file 600 searched by the support apparatus 500, whether the slave information file 600 is suitable for the target slave device 200.

The control apparatus 100 acquires the node address from the non-volatile memory 220 of the target slave device 200 based on the unique storage position information acquired by the series of processing described above. Subsequent processing is similar to that of the above Embodiment 1, and therefore detailed description will not be repeated.

In Embodiment 2, the latest slave information file 600 can always be used by using the slave information file server 700, and thus, even when a new slave device 200 is connected to the field network 4, a situation where the node address cannot be acquired can be avoided.

Figure 11:
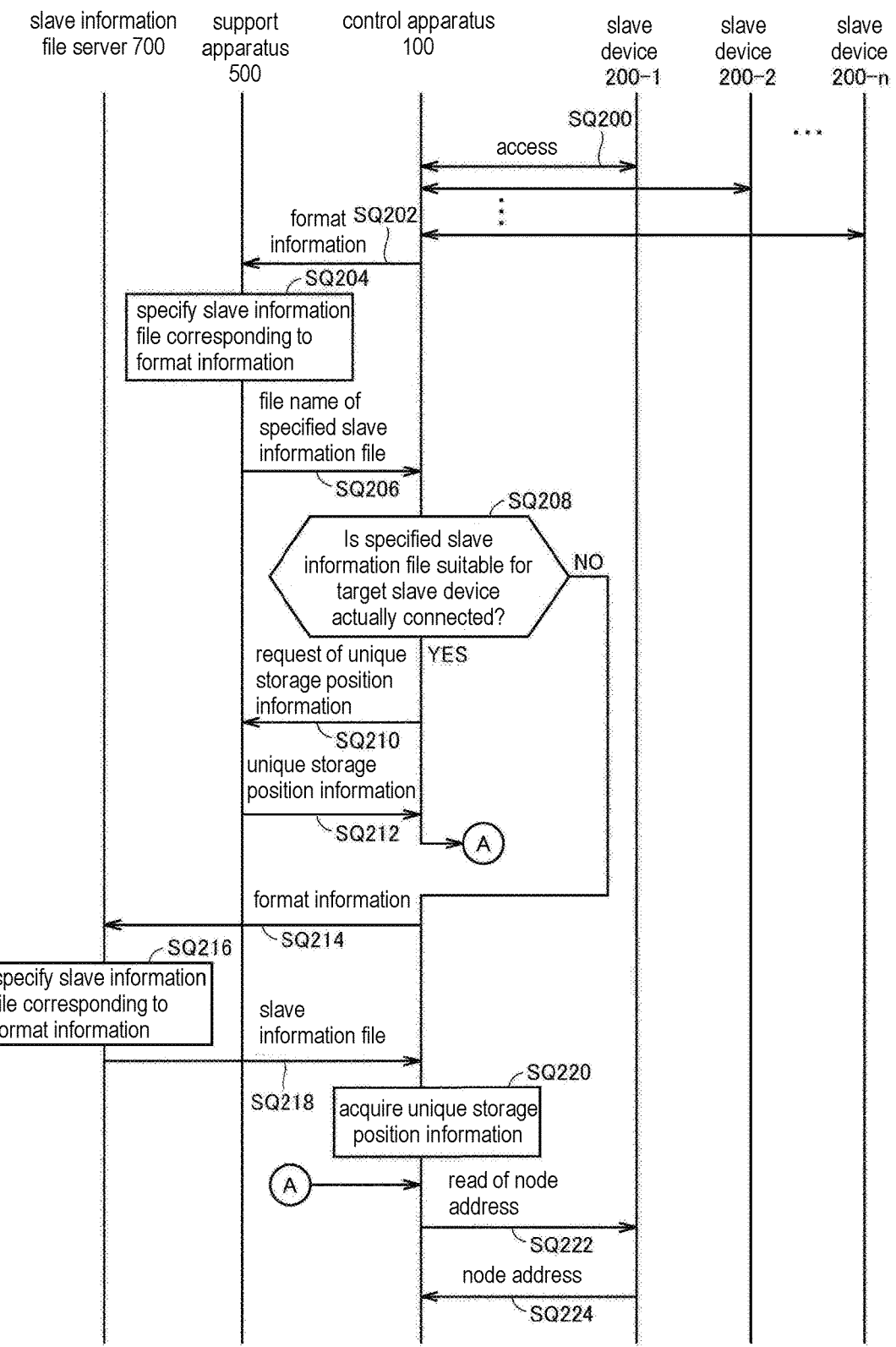
FIG. 11 is a sequence diagram showing the processing procedure of acquiring the node address in the control system according to Embodiment 2.

FIG. 11 is a sequence diagram showing a processing procedure of acquiring a node address in the control system 1 according to Embodiment 2. In FIG. 11, description of the same processing as the processing shown in FIG. 9 is omitted.

With reference to FIG. 11, the control apparatus 100 accesses the slave device 200 connected to the field network 4 to acquire the format information 224 (sequence SQ200), and responds to the support apparatus 500 with the acquired result (sequence SQ202).

The support apparatus 500 searches the slave information file 600 stored in advance and specifies the slave information file 600 corresponding to the format information 224 from the control apparatus 100 (sequence SQ204). Then, the support apparatus 500 notifies the control apparatus 100 of the file name of the specified slave information file 600 (sequence SQ206).

The control apparatus 100 determines, based on the file name of the slave information file 600 from the support apparatus 500, whether the slave information file 600 specified by the support apparatus 500 is suitable for the target slave device 200 actually connected (sequence SQ208).

When the slave information file 600 specified by the support apparatus 500 is suitable for the slave device 200 actually connected (YES in sequence SQ208), the control apparatus 100 requires the unique storage position information described in the specified slave information file 600 from the support apparatus 500 (sequence SQ210). The support apparatus 500 responds to the control apparatus 100 with the unique storage position information described in the identified slave information file 600 in accordance with the request from the control apparatus 100 (sequence SQ212). Then, the processing of sequence SQ222 and thereafter is executed.

On the other hand, if the slave information file 600 specified by the support apparatus 500 is not suitable for the target slave device 200 actually connected (NO in sequence SQ208), the control apparatus 100 sends the format information 224 acquired from the target slave device 200 to the slave information file server 700 (sequence SQ214).

The slave information file server 700 searches the slave information file 600 stored in advance and specifies the slave information file 600 corresponding to the format information 224 from the control apparatus 100 (sequence SQ216). Then, the slave information file server 700 responds to the control apparatus 100 with the specified slave information file 600 (sequence SQ218).

The control apparatus 100 acquires the unique storage position information described in the slave information file 600 from the slave information file server 700 (sequence SQ220).

The control apparatus 100 that has acquired the unique storage position information by any of the methods described above reads the node address 222 stored in the non-volatile memory 220 of the target slave device 200 according to the acquired unique storage position information (sequence SQ222), and responds to the support apparatus 500 with the read node address 222 (sequence SQ224).

By the procedure described above, the control apparatus 100 can acquire the node address from any slave device 200.

<F. Modification Example of Embodiment 2>

In the above Embodiment 2, the example in which the control apparatus 100 accesses the slave information file server 700 has been shown, but the present invention is not limited to this, and any apparatus may access the slave information file server 700.

For example, the support apparatus 500 may determine whether the slave information file 600 stored in the support apparatus 500 is suitable for the target slave device 200, and access, if necessary, the slave information file server 700 to acquire the latest slave information file 600.

<G. Embodiment 3>

In the above Embodiment 2, the example has been described in which the control apparatus 100 determines the suitability of the slave information file 600 stored in the support apparatus 500 and requires the slave information file 600 to the slave information file server 700 if necessary. Instead of the slave information file server 700, a server that directly responds to the unique storage position information may be arranged.

In Embodiment 3, a configuration is employed in which a plurality of slave information files 600 are held and a machine management server 800 is arranged which searches the target slave information file 600 according to the request from the control apparatus 100 or the like and responds to the unique storage position information from the description of the searched slave information file 600.

Figure 12:
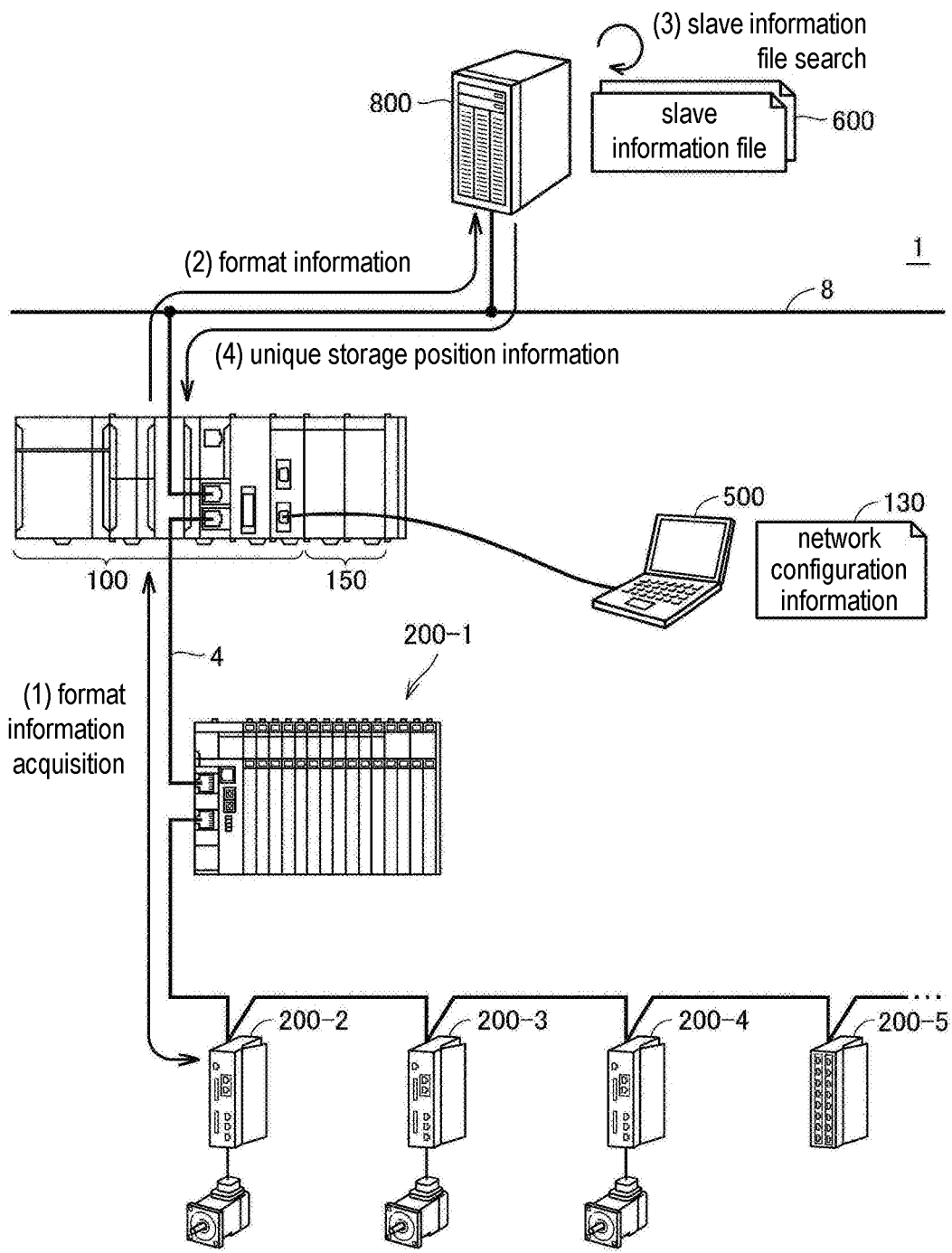
FIG. 12 is a diagram illustrating a processing procedure of acquiring a node address in a control system according to Embodiment 3.

FIG. 12 is a diagram for illustrating a processing procedure of acquiring a node address in the control system 1 according to Embodiment 3. In FIG. 12, description of the same processing as the processing shown in FIG. 8 is omitted.

With reference to FIG. 12, the machine management server 800 that manages the slave information file 600 is connected to the information system network 8. The machine management server 800 appropriately collects and stores the slave information file 600 provided by a vendor (manufacturer or seller) of the slave device 200.

First, the control apparatus 100 acquires format information from any slave device 200 connected to the field network 4 ((1) format information acquisition), and sends the acquired format information to the machine management server 800 ((2) format information).

The machine management server 800 searches the slave information file 600 stored in advance using the format information 224 from the control apparatus 100 as a key ((3) slave information file search). The format information 224 includes the vendor code, the product model, the revision number, and the like of each slave device 200. All the information included in the format information 224 may be used for the search, or only part of the information may be used for the search.

When the slave information file 600 corresponding to the format information serving as the key is found, the slave information file 600 responds to the control apparatus 100 with the unique storage position information with reference to the contents of the slave information file 600 ((4) unique storage position information).

Moreover, data may be exchanged between the control apparatus 100 and the machine management server 800 by using a database operation language such as SQL or the like.

As described above, in Embodiment 3, the machine management server 800 that manages the slave information file for each model of the slave device 200 is arranged in the control system 1. The master device (the control apparatus 100) sends the format information 134 acquired from any slave device 200 to the machine management server 800, thereby receiving response of the information (the unique storage position information) which is described in the corresponding slave information file and identifies the region in which the node address is stored.

The control apparatus 100 acquires the node address from the non-volatile memory 220 of the target slave device 200 based on the unique storage position information acquired by the series of processing described above. Subsequent processing is similar to that of the above Embodiment 1, and therefore detailed description is not repeated.

As described above, in Embodiment 3, the latest slave information file 600 can be always used by using the machine management server 800, and thus, even when a new slave device 200 is connected to the field network 4, a situation where the node address cannot be acquired can be avoided.

Figure 13:
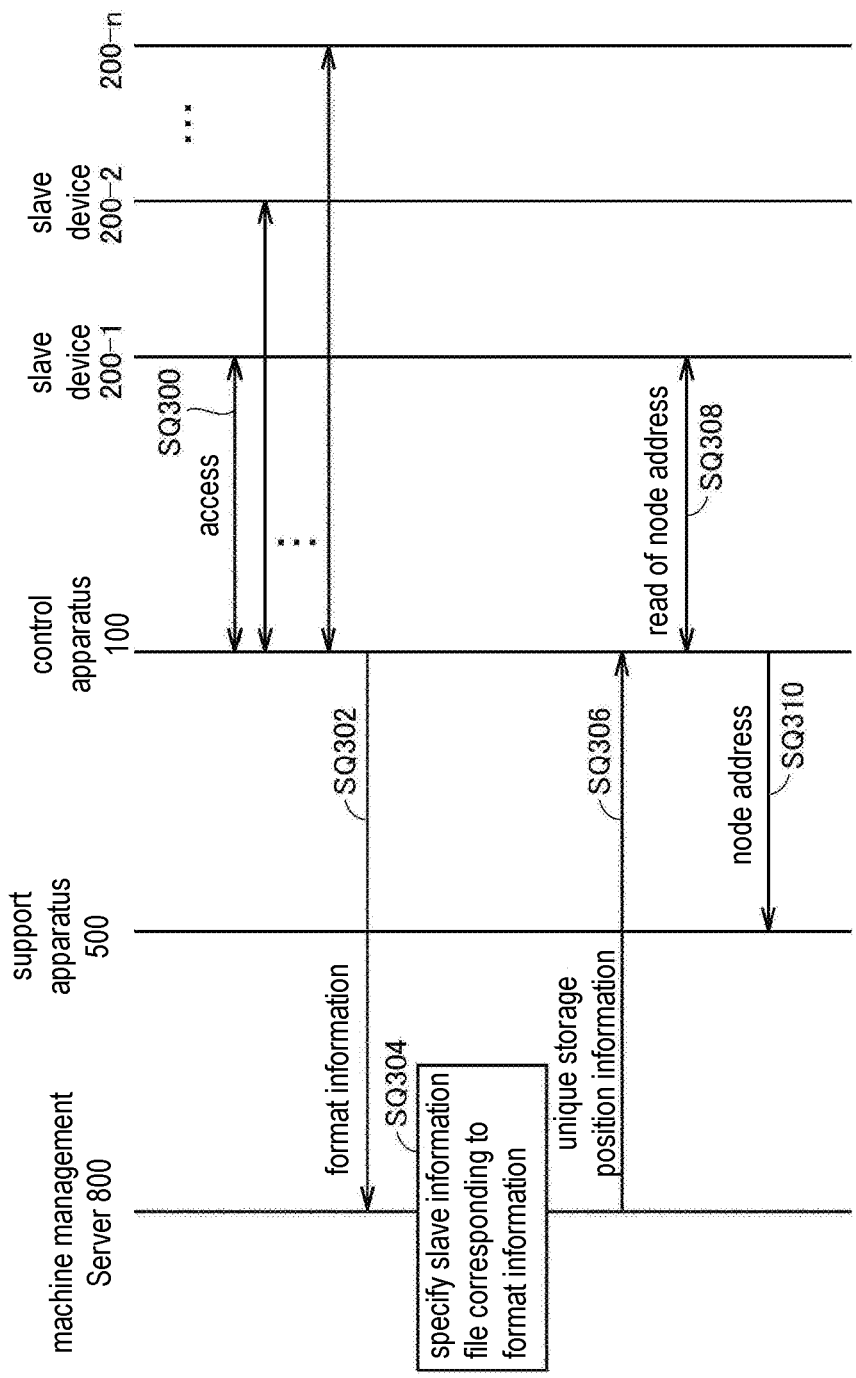
FIG. 13 is a sequence diagram showing the processing procedure of acquiring the node address in the control system according to Embodiment 3.

FIG. 13 is a sequence diagram showing a processing procedure of acquiring a node address in the control system 1 according to Embodiment 3. In FIG. 13, description of the same processing as the processing shown in FIG. 9 is omitted.

With reference to FIG. 13, the control apparatus 100 accesses the slave device 200 connected to field network 4 to acquire the format information 224 (sequence SQ300), and sends the acquired result to the machine management server 800 (sequence SQ302).

The machine management server 800 searches the slave information file 600 stored in advance, specifies the slave information file 600 corresponding to the format information 224 from the control apparatus 100 (sequence SQ304), and responds to the control apparatus 100 with the unique storage position information described in the specified slave information file 600 (sequence SQ306).

The control apparatus 100 reads the node address 222 stored in the non-volatile memory 220 of the target slave device 200 (sequence SQ308) according to the unique storage position information from the machine management server 800, and responds to the support apparatus 500 with the read node address 222 (sequence SQ310).

By the procedure described above, the control apparatus 100 can acquire the node address from any slave device 200.

<H. Modification Example of Embodiment 3>

In the above embodiment 3, the example in which the control apparatus 100 accesses the machine management server 800 has been shown, but the present invention is not limited to this, and any apparatus may access the machine management server 800.

For example, the support apparatus 500 may receive the format information from the control apparatus 100 and access the machine management server 800 to thereby acquire the corresponding node unique storage position information. By employing this configuration, it becomes unnecessary for the support apparatus 500 to manage the slave information file 600.

<I. Other Embodiments>

The present invention is not limited to the examples shown in the above Embodiments 1 to 3, and any form may be employed as long as the unique storage position information is provided by any method to the control apparatus 100 that cannot acquire the unique storage position information of the slave device 200 to access.

In the above description, the collation processing between the network configuration information 130 and the actual network configuration has been mainly described, but the present invention is not limited to this and can be applied to any processing according to the write-in and read-out of the node address of each slave device 200.

<J. Appendix>

The embodiments as described above include the following technical ideas.

[Configuration 1]

A control system (1), including:
a master device (100); and
one or a plurality of slave devices (200) connected to the master device via a field network (4), wherein each of the one or a plurality of slave devices includes a storage unit (220) storing a node address (222) for identifying each slave device in the field network and format information (224) indicating a model of each slave device, the node address is arranged in a unique region for each model of the slave devices in the storage unit, the master device is capable of accessing the storage unit of any slave device connected to the field network, and the control system further includes an information providing part (500; 700; 800) which provides, in any slave device, information for specifying the region in which the node address is stored in the storage unit to the master device.

[Configuration 2]

The control system according to configuration 1, wherein the information providing part includes a support apparatus (500) connected to the master device, and the support apparatus
searches a slave information file corresponding to format information acquired from a target slave device among slave information files (600) for each model of the slave device stored in advance, and provides, based on the searched slave information file, the information for specifying the region in which the node address is stored to the master device.

[Configuration 3]

The control system according to configuration 2, wherein the master device
determines whether the slave information file searched by the support apparatus is suitable for the target slave device, and acquires, when the slave information file is determined to be not suitable, a slave information file suitable for the target slave device from a slave information file server (700) by sending the format information to the slave information file server managing the slave information file.

[Configuration 4]

The control system according to configuration 3, wherein the master device determines whether the slave information file is suitable for the target slave device based on a file name of the slave information file searched by the support apparatus.

[Configuration 5]

The control system according to configuration 1, wherein the information providing part includes a machine management server (800) which manages the slave information file for each model of the slave device, and the master device receives, by sending the format information acquired from any slave device to the machine management server, a response of the information described in a corresponding slave information file and specifying the region in which the node address is stored.

[Configuration 6]

The control system according to any one of configurations 2 to 5, wherein data is transmitted in the field network according to EtherCAT (registered trademark).

[Configuration 7]

The control system according to configuration 6, wherein the slave information file is an EtherCAT slave information (ESI) file.

[Configuration 8]

The control system according to any one of configurations 1 to 7, wherein the slave device includes a hardware switch (204) setting a value of the node address.

[Configuration 9]

A control method which is in a control system (1) including a master device (100) and one or a plurality of slave devices (200) connected to the master device via a field network (4), wherein each of the one or a plurality of slave devices includes a storage unit (220) storing a node address for identifying each slave device in the field network and format information indicating a model of each slave device, the node address is arranged in a unique region for each model of the slave devices in the storage unit, and the control method includes:

a step (SQ116; SQ212, SQ218; SQ306) of providing, in any slave device, information for specifying the region in which the node address is stored in the storage unit to the master device, and a step (SQ118; SQ222; SQ308) in which the master device accesses the storage unit of any slave device connected to the field network based on the information for specifying the region in which the node address is stored.

<K. Advantage>

In the control system according to the embodiment, the node address can be acquired from each slave device even when the master device lacks the prior information, and thus various functions can be provided.

The embodiments disclosed this time should be considered as illustrative in all points and not restrictive. The scope of the present invention is shown not by the above description but by the claims, and is intended to include meanings equivalent to the claims and all modifications within the scope.

What is claimed is:

1. A control system, comprising:
a master device; and
one or a plurality of slave devices connected to the master device via a field network, wherein
each of the one or the plurality of slave devices comprises a storage unit storing a node address for identifying each of the slave devices in the field network and format information indicating a model of each of the slave devices,
the node address is arranged in a unique region for each model of the slave devices in the storage unit,
the master device is capable of accessing the storage unit of any one of the slave devices connected to the field network, and
the control system further comprises an information providing part which provides, in any one of the slave devices, information for specifying a region in which the node address is stored in the storage unit to the master device,
wherein the information providing part comprises a support apparatus connected to the master device, and
the support apparatus searches a slave information file corresponding to format information acquired from a target slave device among slave information files for each model of the slave devices stored in advance, and provides, based on the searched slave information file the information for specifying the region in which the node address is stored to the master device, and
the master device determines whether the slave information file searched by the support apparatus is suitable for the target slave device, and acquires, when the slave information file is determined to be not suitable, a slave information file suitable for the target slave device from a slave information file server by sending the format information to the slave information file server that manages the slave information file.

2. The control system according to claim 1, wherein the master device determines whether the slave information file is suitable for the target slave device based on a file name of the slave information file searched by the support apparatus.

3. The control system according to claim 1, wherein
the information providing part comprises a machine management server which manages the slave information file for each model of the slave devices, and
the master device receives, by sending the format information acquired from any one of the slave devices to the machine management server, a response of the information described in a corresponding slave information file and specifying the region in which the node address is stored.

4. The control system according to claim 1, wherein data is transmitted in the field network according to EtherCAT (registered trademark).

5. The control system according to claim 4, wherein the slave information file is an EtherCAT slave information (ESI) file.

6. The control system according to claim 1, wherein the slave device comprises a hardware switch setting a value of the node address.

7. A control method for a control system comprising a master device, one or a plurality of slave devices connected to the master device via a field network and an information providing part including a support apparatus connected to the master device, wherein
each of the one or the plurality of slave devices comprises a storage unit storing a node address for identifying each of the slave devices in the field network and format information indicating a model of each of the slave devices,
the node address is arranged in a unique region for each model of the slave devices in the storage unit, and
the control method comprises:
a step of providing by the information providing part, in any one of the slave devices, information for specifying a region in which the node address is stored in the storage unit to the master device;
a step in which the master device accesses the storage unit of any one of the slave devices connected to the field network based on the information for specifying the region in which the node address is stored;
a step in which the support apparatus searches a slave information file corresponding to format information acquired from a target slave device among slave information files for each model of the slave devices stored in advance, and provides, based on the searched slave information file, the information for specifying the region in which the node address is stored to the master device; and
a step in which the master device determines whether the slave information file searched by the support apparatus is suitable for the target slave device, and acquires, when the slave information file is determined to be not suitable, a slave information file suitable for the target slave device from a slave information file server by sending the format information to the slave information file server that manages the slave information file.

* * * * *